(12) United States Patent
Huang et al.

(10) Patent No.: US 12,689,584 B2
(45) Date of Patent: Jul. 21, 2026

(54) AUTOMATIC INTERNET PORT IDENTIFICATION METHOD AND DEVICE FOR PERFORMING THE METHOD

(71) Applicant: D-LINK CORPORATION, Taipei (TW)

(72) Inventors: Hao-Chin Huang, Taipei (TW); Ting-Wei Liu, Taipei (TW)

(73) Assignee: D-LINK CORPORATION, Taipei City (TW)

( * ) Notice: Subject to any disclaimer, the term of this patent is extended or adjusted under 35 U.S.C. 154(b) by 33 days.

(21) Appl. No.: 18/761,565

(22) Filed: Jul. 2, 2024

(65) Prior Publication Data
US 2025/0373548 A1 Dec. 4, 2025

(30) Foreign Application Priority Data
May 31, 2024 (TW) ................................. 113120296

(51) Int. Cl.
*H04L 45/74* (2022.01)
*H04L 41/0869* (2022.01)
*H04L 45/02* (2022.01)

(52) U.S. Cl.
CPC .......... *H04L 45/74* (2013.01); *H04L 41/0869* (2013.01); *H04L 45/04* (2013.01)

(58) Field of Classification Search
CPC ............. H04L 12/2854; H04L 12/2898; H04L 41/082; H04L 41/0853; H04L 41/0879; H04L 41/0886; H04L 43/50; H04L 61/5092; H04L 67/56; H04L 69/04; H04L 47/10; H04L 47/2441; H04L 47/193;

H04L 67/568; H04L 47/24; H04L 47/27; H04L 67/5682; H04L 67/2876; H04L 67/5681; H04L 69/16; H04L 41/12; H04L 43/0829; H04L 47/2475; H04L 47/70; H04L 1/1887; H04L 1/189; H04L 2001/0092; H04L 47/2433; H04L 47/822; H04L 63/0281; H04L 67/02; H04L 43/028; H04L 63/166; H04L 65/80; H04L 41/00; H04L 47/11; H04L 47/22; H04L 47/6215;

(Continued)

(56) References Cited

U.S. PATENT DOCUMENTS

| | | | | |
|---|---|---|---|---|
| 9,344,402 | B2 * | 5/2016 | Liu ...................... | H04L 61/5007 |
| 10,257,295 | B1 * | 4/2019 | Alpert ................... | H04L 67/535 |

(Continued)

*Primary Examiner* — Djenane M Bayard
(74) *Attorney, Agent, or Firm* — Workman Nydegger

(57) ABSTRACT

An automatic internet port identification method executed after being loaded by a system, includes a step 1: sending DHCP Discovery, PPPoE PADI, and RS packets to multiple ports of a physical network by a router, and a step 2: monitoring the ports and identifying the port that first receives one of DHCP ACK, PPPoE PADO, or RA packets as a WAN port, the remaining ports being identified as LAN ports. The method automatically identifies WAN ports with both IPv4 and IPv6 internet connection capabilities. By sending specific packets and continuously monitoring the response packets from each port, the identified results are applied to all ports. This allows users to connect ISP and other users' equipment based solely on connection speed without needing to consider the type of port. The method automatically determines the port connected to the ISP as WAN, with the remaining ports as LAN.

12 Claims, 2 Drawing Sheets

(58) Field of Classification Search
   CPC ..... H04L 47/803; H04L 67/10; H04L 67/564;
                  H04L 67/5651; H04L 69/166; H04L
                  67/1095; H04L 69/22; H04L 43/0817;
                  H04L 45/24; H04L 45/74; G06F 9/4416
   See application file for complete search history.

(56)                    References Cited

U.S. PATENT DOCUMENTS

| | | | |
|---|---|---|---|
| 2004/0114610 A1* | 6/2004 | Featherston ........ | H04L 12/2898 |
| | | | 370/401 |
| 2010/0121946 A1* | 5/2010 | Claes ................. | H04L 61/5014 |
| | | | 709/223 |
| 2014/0108597 A1* | 4/2014 | Donley .................. | H04L 63/02 |
| | | | 709/217 |
| 2014/0115142 A1* | 4/2014 | Peng .................. | H04L 41/0816 |
| | | | 709/223 |
| 2015/0222734 A1* | 8/2015 | Inada ................. | H04L 12/4633 |
| | | | 370/315 |
| 2025/0126093 A1* | 4/2025 | Huang ............... | H04L 61/5014 |

\* cited by examiner

AUTOMATIC INTERNET PORT IDENTIFICATION METHOD AND DEVICE FOR PERFORMING THE METHOD

FIELD OF THE INVENTION

The present invention relates to an automatic internet port identification method and device, particularly one that can automatically identify WAN ports with both IPv4 and IPV6 internet connection capabilities. The identified results are then applied to all ports, automatically designating ports with internet connection capabilities as WAN, while other ports are designated as LAN.

BACKGROUND OF THE INVENTION

Due to the insufficient addressing space of IPV4 (Internet Protocol Version 4), the large demand for IP addresses on the current internet cannot be satisfied, and this makes the implementation of the next-generation internet protocol, IPv6 (Internet Protocol Version 6) inevitable. The IPV6 setup for existing Customer Premise Equipment (CPE) routers mostly requires user intervention, and different Internet Service Providers (ISPs) provide different IPv6 environment settings, which increases the technical barriers to using IPV6.

In addition, current CPE routers not only support 1000MBase-T but also have the capability for 2.5GBase-T, 5GBase-T, and even 10GBase-T connections. However, different users and usage scenarios may require ports with different connection capabilities to serve as WAN ports. Considering the additional requirements for IPV4 and IPv6 network setups, this further increases the complexity of network configuration and setup.

The present invention intends to provide an automatic internet port identification method and device to eliminate the shortcomings mentioned above.

SUMMARY OF THE INVENTION

The present invention relates to an automatic internet port identification method, the method is executed after being loaded by a system, and comprises the following steps:
  Step 1: Sending DHCP Discovery, PPPoE PADI, and RS (Router Solicitation) packets to multiple ports of a physical network by a router, and
  Step 2: Monitoring the ports and identifying the port that first receives one of DHCP ACK, PPPoE PADO (PP-PoE Active Discovery Offer), or RA (Router Advertisement) packets as a WAN (Wide Area Network) port, the remaining ports being identified as LAN (Local Area Network) ports.
  Preferably, a Router Lifetime tag of the RA (Router Advertisement) that monitors the ports is greater than 0.
  Preferably, the port that receives the RA is identified as a WAN for the IPv6 internet protocol.
  Preferably, the method further comprises a WAN verification configuration method, which includes the following steps:
  Step 1: Based on whether the WAN is in the form of DHCP, Static IP, or PPPoE, respectively sending DHCP Discovery or DHCP Request, PPPoE PADI, or ARP Request (Address Resolution Protocol Request) packets to the ports;
  Step 2: Monitoring the ports to check for receipt of responses of the DHCP ACK, the PPPoE PADO, or the ARP ACK corresponding thereto, and Step 3: Identifying the port that receives the response as a WAN, and the remaining ports are identified as a LAN.
  Preferably, the WAN verification configuration step further includes:
  Step 1: If the WAN is DHCP or Static IP and no response is received, sending RS (Router Solicitation) or NS (Neighbor Solicitation) packets to the ports; and
  Step 2: Monitoring the ports for RA (Router Advertisement) or NA (Neighbor Advertisement) responses, and if the RA (Router Advertisement) or the NA (Neighbor Advertisement) responses are received, identifying the corresponding port as an IPV6 WAN.
  Preferably, the WAN verification configuration method further comprises a step that when the WAN IPV6 configuration is Static IP, directly sending NS packets and identifying the corresponding port as the IPV6 WAN upon receiving an NA response.
  Preferably, the WAN verification configuration method further comprises step that when the WAN IPv4 configuration is Static IP, initially sending an ARP Request, and upon receiving an ARP Reply, directly identifying the port as the IPV4 WAN, if no ARP Reply is received, sending RS or NS packets to the ports.
  Preferably, the WAN verification configuration method further comprises a step that if no DHCP ACK or ARP Reply is received and the protocol is not IPV6, or if RS or NS packets are sent to the port and no corresponding RA or NA response is received, identifying the corresponding port as a LAN.
  The present invention also provides an automatic internet port identification device and comprises a processor and at least one storage device. The at least one storage device stores an instruction executed by the processor to implement an automatic internet port identification method. The automatic internet port identification method comprises the following steps:
  Step 1: Sending DHCP Discovery, PPPoE *PADI*, and RS (Router Solicitation) packets to multiple ports of a physical network by a router, and
  Step 2: Monitoring the ports and identifying the port that first receives one of DHCP ACK, PPPoE PADO (PP-PoE Active Discovery Offer), or RA (Router Advertisement) packets as a WAN (Wide Area Network) port, the remaining ports being identified as LAN (Local Area Network) ports.
  Preferably, the automatic internet port identification device further comprises a WAN verification configuration method which includes the following steps:
  Step 1: Based on whether the WAN is in the form of DHCP, Static IP, or PPPoE, respectively sending DHCP Discovery or DHCP Request, PPPoE PADI, or ARP Request (Address Resolution Protocol Request) packets to the ports;
  Step 2: Monitoring the ports to check for receipt of responses of the DHCP ACK, the PPPoE PADO, or the ARP ACK corresponding thereto, and
  Step 3: Identifying the port that receives the response as a WAN, and the remaining ports are identified as a LAN.
  The advantages of the present invention are that the present invention works by sending DHCP Discovery, PPPoE PADI, and RS packets to all ports. The port that receives one of DHCP ACK, PPPoE PADO, or RA is identified as the WAN port, and its access type is determined to be either DHCP, PPPoE, or IPV6. The remaining ports are identified as LAN. This process allows for the rapid identification and configuration of the WAN without manual settings, greatly enhancing the convenience and efficiency of network setup.

Through the WAN verification configuration step, the present invention can be applied to routers after initial setup for port verification. It automatically detects and reconfigures potential changes in port types. Based on the network settings, it determines whether to send DHCP Discovery, PPPoE PADI, or ARP Request packets, and monitors the ports for corresponding DHCP ACK, PPPoE PADO, or ARP ACK responses. The port that receives the corresponding response is identified as the WAN, while the remaining ports are identified as LAN. This process verifies and reconfigures the ports. Additionally, it sends RS or NS packets to check for RA or NA responses to identify ports that may be IPV6 WAN, facilitating the setup of an IPV6 environment.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
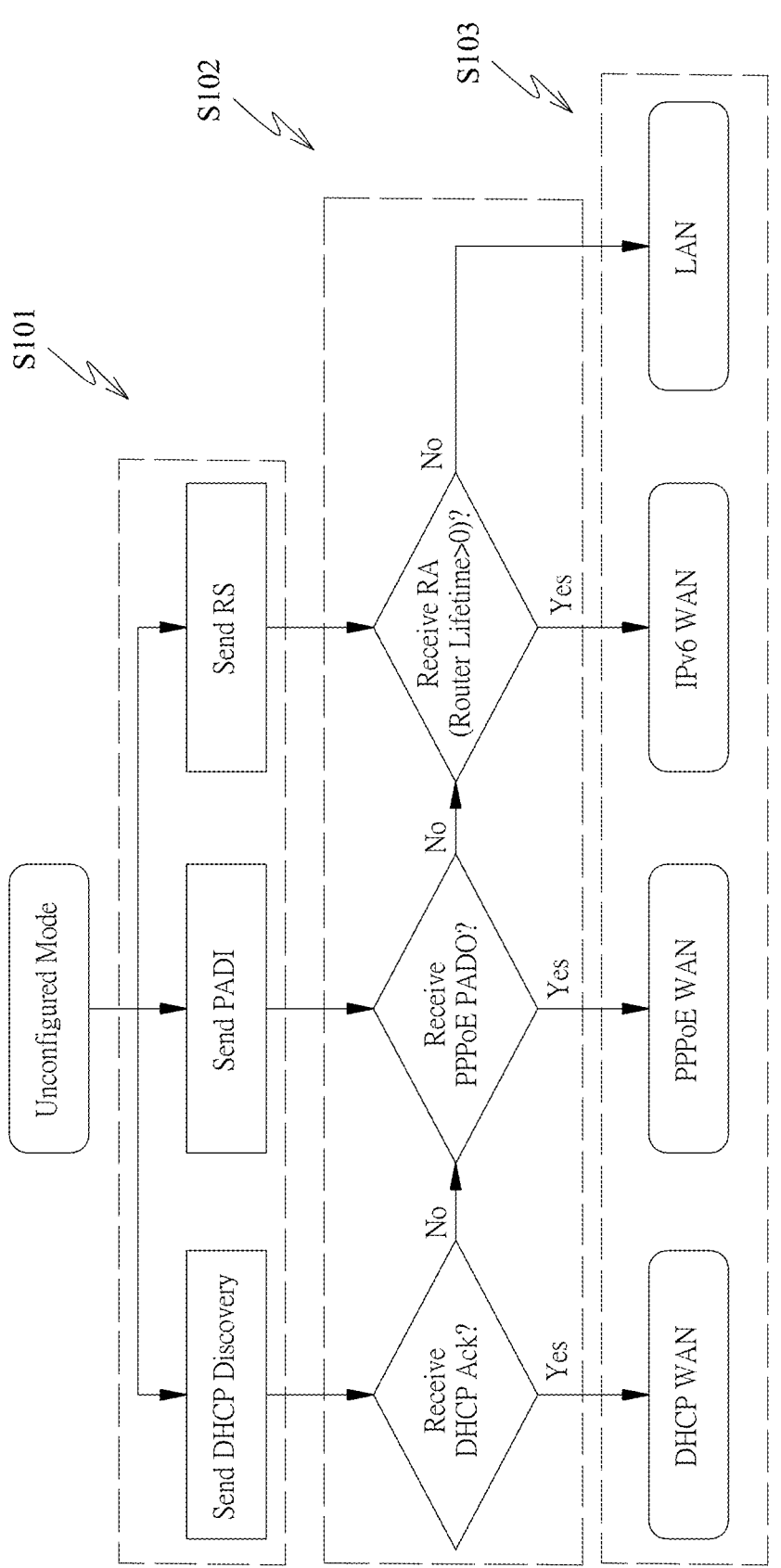
FIG. 1 is a flowchart of the present invention in an un-configured mode.

Referring to FIG. 1, the present invention is an automatic internet port identification method executed after being loaded by a system. The system described in the present invention can be a functional program or a device, which can be equipped with a processor and at least one storage device. The storage device stores at least one instruction, and at least one of these instructions can be executed by the processor of the device. Therefore, it can be understood that the device can be a computer or a wireless base station, such as a router, wireless control unit, or wireless extender, though these are merely examples and not limitations. In one embodiment, the present invention can be performed interactively, automatically, or semi-automatically, and upon completion of the steps, it can identify and configure multiple ports of the physical network.

The present invention is applicable in the IPv6 era, where client routers can recognize the configuration method required for the network ports provided by the Internet Service Provider (ISP). In one embodiment, the present invention can be applied to the initial setup of a router in its factory default state by the user, even when the user's internet settings are unknown. When the router is in an un-configured mode, as shown in FIG. 1, the steps include:

S101: Sending not only IPv4 DHCP Discovery and PPPoE PADI packets but also RS (Router Solicitation) packets, which are required in mixed IPv4 and IPv6 mode or in IPv6 only mode, to the ports configured on the router;

S102: Monitoring the ports and checking for the receipt of any of the following three response packets:
1. DHCP ACK (including its IP address and gateway).
2. PPPoE PADO (PPPoE Active Discovery Offer).
3. RA (Router Advertisement), which must have a Router Lifetime tag greater than 0.

S103: Identifying the first port that receives one of the above three response packets as WAN (Wide Area Network) port, while the remaining ports are identified as LAN (Local Area Network) ports. At this point, the user can use the detected port for the corresponding connection setup. For example, when a DHCP ACK is received, the port is identified as a DHCP WAN, and the IPV4 DHCP configuration can be automatically performed to establish the connection. When a PPPoE PADO response is received, the port is identified as a PPPoE WAN, and the required password settings (such as PPPoE) can be completed manually or automatically to connect to the internet. Upon receiving an RA response, the port is identified as an IPV6 WAN.

When after waiting for a certain period (e.g., 10 seconds), no ports receive the aforementioned response packets, it is determined that there are no suitable ports for WAN. In this case, the user can be notified via a webpage to check if the line installation is correct.

Figure 2:
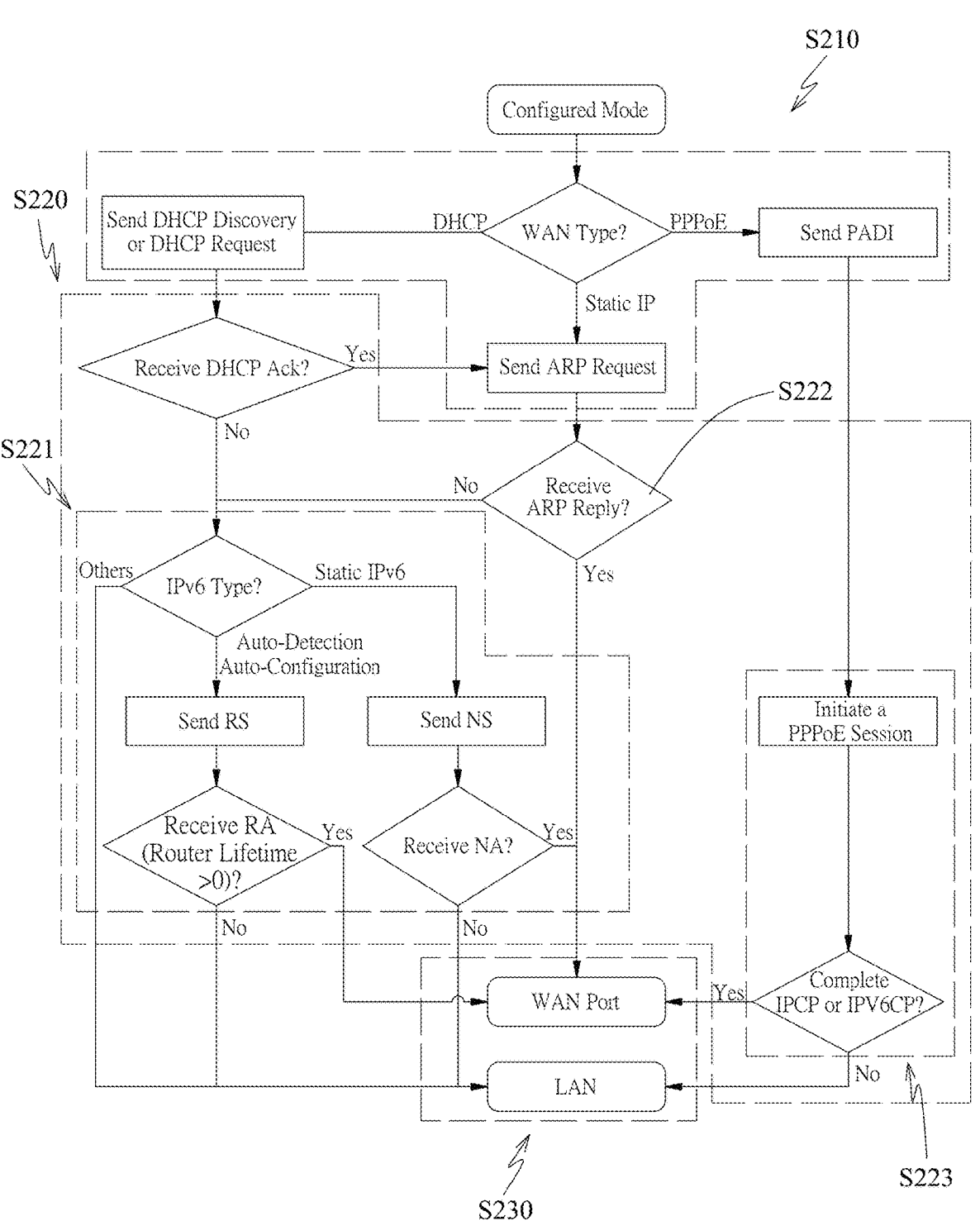
FIG. 2 is a flowchart of the present invention in a configured mode.

For routers that have already been configured and based on the premise of knowing the user's network settings, the router operates in a configured mode. It can be set using a WAN verification configuration method, as shown in FIG. 2, which includes the following steps:

S210: Based on the user's configured WAN type (DHCP, Static IP, or PPPoE), sending the corresponding DHCP Discovery or DHCP Request, PPPoE PADI, or ARP Request (Address Resolution Protocol Request) packets to the ports;

S220: Monitoring the ports and checking for the receipt of the corresponding DHCP ACK, PPPoE PADO, or ARP ACK response;

S230: Identifying the ports that receive the responses as WAN, and the others as LAN (i.e., non-WAN ports).

In step S220, as shown in step S221, if the WAN is configured as DHCP or Static IP and no DHCP ACK or ARP ACK response is received within a certain period (e.g., 10 seconds), it is determined whether the port might be an IPV6 WAN. At this point, RS or NS (Neighbor Solicitation) packets can be sent to the said ports. By monitoring the ports for RA (with Router Lifetime tag greater than 0) or NA (Neighbor Advertisement) responses, if such responses are received, the corresponding port is identified as IPV6 WAN. This supplements the confirmation of the correct WAN port when the router is currently set to enable IPV6. Preferably, when the WAN IPV6 setting is Static IP, an NS packet is directly sent to the configured IPV6 Static gateway instead of sending an RS. Upon receiving an NA response, the corresponding port is directly identified as IPv6 WAN, avoiding unnecessary multicast packets entering the detected ports.

Continuing with step S222, when the WAN is configured with a Static IPv4, an ARP Request can be sent directly to the default gateway set by the ISP to request a confirmation response. Upon receiving an ARP Reply, the port is directly identified as an IPV4 WAN. This avoids additional broadcast packets and speeds up the verification, determination, and configuration of the WAN. If no ARP Reply is received, as stated in step S221, it is determined whether the port is for an IPV6 protocol, and RS or NS packets can be sent to the port accordingly.

In step S223, when the WAN is in PPPoE form, a PPPoE session can be directly initiated, allowing the user to manually or automatically complete the required password setup for IPCP (IP Control Protocol) or IPv6 protocol to connect to the internet, thereby completing the PPPoE WAN configuration.

In step S230, if no DHCP ACK or ARP Reply is received while monitoring the port, and if it is not an IPV6 protocol, or if RS or NS packets are received without a corresponding RA or NA response, or if the WAN is in PPPoE form but the IPCP or IPv6 connection is not completed, the port is considered non-WAN and identified as LAN.

The present invention also provides an automatic internet port identification device and comprises a processor and at least one storage device. The at least one storage device stores an instruction executed by the processor to implement an automatic internet port identification method. The automatic internet port identification method comprises the following steps:

Step 1: Sending DHCP Discovery, PPPoE *PADI*, and RS (Router Solicitation) packets to multiple ports of a physical network by a router, and Step 2: Monitoring the ports and identifying the port that first receives one of DHCP ACK, PPPoE PADO (PPPoE Active Discovery Offer), or RA (Router Advertisement) packets as a WAN (Wide Area Network) port, the remaining ports being identified as LAN (Local Area Network) ports.

Preferably, the automatic internet port identification device further comprises a WAN verification configuration method which includes the following steps:

Step 1: Based on whether the WAN is in the form of DHCP, Static IP, or PPPoE, respectively sending DHCP Discovery or DHCP Request, PPPoE PADI, or ARP Request (Address Resolution Protocol Request) packets to the ports;

Step 2: Monitoring the ports to check for receipt of responses of the DHCP ACK, the PPPoE PADO, or the ARP ACK corresponding thereto, and Step 3: Identifying the port that receives the response as a WAN, and the remaining ports are identified as a LAN.

Thus, the present invention can, whether in an un-configured or configured mode, automatically identify whether a port has internet connection characteristics under the current IPv6 environment. It can further configure the settings accordingly based on the response, enabling automatic and rapid network connection setup. In the configured mode, it can also automatically identify and verify the WAN form, accommodating potential changes in the devices connected to the ports. Verification is performed according to the WAN form using DHCP Discovery, DHCP Request, PPPoE PADI, or ARP Request. Depending on the connection type, such as Static IPv4 or Static IPv6, other steps can be directly omitted by sending ARP Request or NS, avoiding additional broadcast packets and verification time, thereby improving the efficiency of port identification and network configuration.

While we have shown and described the embodiment in accordance with the present invention, it should be clear to those skilled in the art that further embodiments may be made without departing from the scope of the present invention.

What is claimed is:

1. An automatic internet port identification method for execution by a system, comprising:

by a router, concurrently sending initialization packets to each port of a plurality of ports of a physical network, the initialization packets to each port of the plurality of ports including at least one DHCP Discovery packet, at least one PPPoE *PADI* packet, and at least one RS (Router Solicitation) packet;

monitoring the plurality of ports for receipt of a response packet, the response packet being one of a DHCP ACK packet, a PPPoE PADO (PPPoE Active Discovery Offer) packet, or a RA (Router Advertisement) packet;

identifying a port, out of the plurality of ports, to first receive the response packet, as a WAN (Wide Area Network) port; and identifying each remaining port of the plurality of ports as a LAN (Local Area Network) port.

2. The automatic internet identification method as claimed in claim 1, wherein a Router Lifetime tag of a RA (Router Advertisement) that monitors the ports is greater than 0.

3. The automatic internet identification method as claimed in claim 1, wherein the WAN port is identified as a WAN configured for IPv6 internet protocol responsive to the received response packet being an RA packet.

4. An automatic internet identification method of a router for execution by a system, comprising verifying a WAN configuration of a router by:

by the router, selectively sending at least one initialization packet corresponding to a pre-configured WAN protocol to at least one port of a plurality of ports of a physical network, wherein the initialization packet corresponding to a DHCP protocol is a DHCP Discovery or DHCP Request packet, the initialization packet corresponding to a PPPoE protocol is a PPPoE *PADI* packet, and the initialization packet corresponding to a Static IP protocol is an ARP Request (Address Resolution Protocol Request) packet;

monitoring the plurality of ports for receipt of a response packet corresponding to the sent initialization packet, wherein the response packet corresponding to the DHCP Discovery or DHCP Request packet is a DHCP ACK packet, the response packet corresponding to the PPPoE *PADI* packet is a PPPoE PADO packet, and the response packet corresponding to the ARP Request packet is an ARP Reply packet;

identifying a port, out of the plurality of ports, to first receive the corresponding response packet, as a WAN (Wide Area Network) port; and identifying each remaining port of the plurality of ports as a LAN (Local Area Network) port.

5. The automatic internet port identification method as claimed in claim 4, wherein the pre-configured WAN protocol is DHCP or Static IP, the method further comprising:

responsive to lack of receipt of the corresponding response packet within a predetermined time period, sending at least one solicitation packet to at least one of the plurality of ports, the at least one solicitation packet being one of an RS (Router Solicitation) packet or an NS (Neighbor Solicitation) packet; and monitoring the plurality of ports for receipt of a solicitation response packet, the solicitation response packet being one of a RA (Router Advertisement) packet or a NA (Neighbor Advertisement) response packet, wherein the port, out of the plurality of ports, to first receive the solicitation response packet is identified as a IPv6 WAN port.

6. The automatic internet port identification method as claimed in claim 5, wherein the pre-configured WAN protocol is IPV6 and Static IP, the solicitation packet is an NS packet and is directly sent to a default gateway port, and the solicitation response packet is an NA response packet.

7. The automatic internet port identification method as claimed in claim 4, wherein the pre-configured WAN protocol is IPv4 and Static IP, the sent initialization packet is an ARP Request packet and is directly sent to a default gateway port, and the response packet is an ARP Reply packet, and wherein, responsive to receipt of the response packet by the default gateway port within a predetermined time period, the default gateway port is identified as an IPV4 WAN port.

8. The automatic internet port identification method as claimed in claim 4, wherein the pre-configured WAN protocol is DHCP or Static IP and is not an IPV6 protocol, and wherein, responsive to lack of receipt of the response packet within a predetermined time period, each port of the plurality of ports is identified as a LAN port.

9. The automatic internet port identification method as claimed in claim 4, wherein the pre-configured WAN protocol is IPV4 and Static IP, the sent initialization packet is an ARP Request packet response, and the response packet is an ARP Reply packet, the method further comprising:

responsive to lack of receipt of the corresponding response packet within a predetermined time period, sending at least one solicitation packet to at least one of the plurality of ports, the at least one solicitation packet being one of an RS packet or an NS packet.

10. The automatic internet port identification method as claimed in claim 9, further comprising:

monitoring the plurality of ports for receipt of a solicitation response packet, the solicitation response packet being one of a RA (Router Advertisement) packet or a NA (Neighbor Advertisement) response packet, wherein, responsive to lack of receipt of the solicitation response packet within a predetermined time period, each port of the plurality of ports is identified as a LAN port.

11. An automatic internet port identification device, comprising:

a processor and at least one storage device, the at least one storage device storing at least one instruction executable by the processor to implement an automatic internet port identification method for an un-configured router, the automatic internet port identification method comprising:

by the router, sending initialization packets to each port of a plurality of ports of a physical network, the initialization packets to each port of the plurality of ports including at least one DHCP Discovery packet, at least one PPPoE *PADI* packet, and at least one RS (Router Solicitation) packet;

monitoring the plurality of ports for receipt of a response packet, the response packet being one of a DHCP ACK packet, a PPPoE PADO (PPPoE Active Discovery Offer) packet, or a RA (Router Advertisement) packet;

identifying a port, out of the plurality of ports, to first receive the response packet as a WAN (Wide Area Network) port; and identifying each remaining port of the plurality of ports as a LAN (Local Area Network) port.

12. The automatic internet port identification device as claimed in claim 11, wherein the at least one storage device further stores at least one second instruction executable by the processor to implement a second automatic internet port identification method for a configured router, the second automatic internet port identification method comprising verifying a WAN configuration of the router by:

by the router, selectively sending at least one initialization packet corresponding to a pre-configured WAN protocol to at least one port of the plurality of ports of the physical network, wherein the initialization packet corresponding to a DHCP protocol is the DHCP Discovery packet or a DHCP Request packet, the initialization packet corresponding to a PPPoE protocol is the PPPoE *PADI* packet, and the initialization packet corresponding to a Static IP protocol is an ARP Request (Address Resolution Protocol Request) packet;

monitoring the plurality of ports for receipt of a response packet corresponding to the sent initialization packet, wherein the response packet corresponding to the DHCP Discovery or DHCP Request packet is the DHCP ACK packet, the response packet corresponding to the PPPoE *PADI* packet is the PPPoE PADO packet, and the response packet corresponding to the ARP Request packet is an ARP Reply packet;

identifying a port, out of the plurality of ports, to first receive the corresponding response packet as the WAN (Wide Area Network) port; and identifying each remaining port of the plurality of ports as a LAN (Local Area Network) port.

* * * * *